United States Patent [19]

Ohsol et al.

[11] 3,750,600

[45] Aug. 7, 1973

[54] DISPOSAL OF THERMOPLASTIC MATERIALS

[75] Inventors: Ernest Osborne Ohsol, Stamford, Conn., Arthur Perlmutter, Flushing, N.Y.

[73] Assignee: American Cyanamid Company, Stamford, Conn.

[22] Filed: Apr. 26, 1972

[21] Appl. No.: 247,633

[52] U.S. Cl. .................................. 110/1 R, 110/7 S
[51] Int. Cl. ............................................. F23g 7/00
[58] Field of Search ..................... 110/1 R, 7 R, 7 S, 110/8 R, 18 R

[56] References Cited
UNITED STATES PATENTS

| | | | |
|---|---|---|---|
| 3,357,375 | 12/1967 | Brophy | 110/7 |
| 3,572,265 | 3/1971 | Stockman | 110/18 |
| 3,583,339 | 6/1971 | Kube | 110/7 |

*Primary Examiner*—Kenneth W. Sprague
*Attorney*—Harry H. Kline

[57] ABSTRACT

There is provided a method for the disposal of thermoplastic materials utilizing a fuel oil as a solvent for said thermoplastic, by dissolving from about 1 to about 20 percent, by weight, of a thermoplastic material or a mixture of said materials in from 99 to 80 percent, by weight, of a fuel oil, in the presence or absence of a cracking catalyst, usually from 1 to 10 percent, by weight, at elevated temperatures under atmospheric or superatmospheric pressure and, thereafter, burning said fuel oil containing thermoplastic material absent tarry residues and other solid, liquid, or gaseous pollutants.

8 Claims, No Drawings

DISPOSAL OF THERMOPLASTIC MATERIALS

The present invention relates to a process for disposing of thermoplastic waste materials. More particularly, it relates to a method for disposing of thermoplastic waste materials by dissolving the latter in a fuel oil and, thereafter, burning the fuel oil so adulterated so as to minimize adverse effluent emissions to the atmopshere. Still more particularly, the invention is concerned with the dissolution of at least 1 to 20 percent, by weight, of one or more thermoplastic waste materials in from 99 to 80 percent, by weight, of a fuel oil in the absence or, preferably, presence of a cracking catalyst, while maintaining the solution at an elevated temperature and pressure and, thereafter, burning the so-treated thermoplastic waste material with resultant minimal effluent pollutants.

It is known that thermoplastic materials used for packing or wrapping, for instance, can be disposed of by burning such as in commercial incinerators. Prior to burning, they may be treated as by irradiation so as to cause depolymerization. Another method is to bury or otherwise dump waste thermoplastic material. However, none of the methods is entirely satisfactory. Due to their chemical inertness, many thermoplastic materials are not easily disposed of by simply burying the waste product. To depolymerize the latter as by irradiation is indeed an economically burdensome procedure. And to burn the thermoplastic waste material in an open pit produces corrosive air pollutants and dense black clouds of smoke. In utilizing a commerical incinerator, the burning thermoplastic waste materials melt and clog the grating causing frequent shutdowns of the incinerator. If an economic process could be provided in which such waste materials can be disposed of without substantial air pollution while minimizing incinerator shutdowns, a long-felt need in the art would be satisfied.

According to the process of the invention, waste thermoplastic materials, either the same or different in chemical composition, are comminuted or shredded and added to any grade of commerically available fuel oil. Preferably, an inexpensive fuel oil may be used, particularly those which conform to the specifications set forth in Commerical Standards CS 12-40 for Nos. 1, 2, 3, and 6 Fuel Oils. The mixture is heated to a temperature of from between 250°C. and 400°C.

In general, from 1 to 20 percent, by weight, of the shredded thermoplastic waste material is admixed in with from 99 to 80 percent of fuel oil to which from 1 to 10 percent of a cracking or depolymerization catalyst is preferably added. Resultant mixture is heated, either under atmospheric or superatmospheric pressure, to form initially a slurry, which slurry upon further heating is converted substantially to a solution, albeit a viscous solution.

The cracking catalyst, which does not dissolve in the aforementioned fuel oil solution, is next removed as by settling or filtration. The so-removed catalyst may then be recycled to the mixer for reuse.

The heated solution is finally employed as the fuel for heating boilers or incinerators. Improved air pollution control is noted with attendant elimination of the difficulties in burning thermoplastics in incinerators along with concomitant thermal energy content increase of the fuel oil.

Advantageously, the fuel oil employed herein as the solvent for the thermoplastic waste material may be No. 1 through No. 6. The latter No. 6 fuel oil, however, is preferred, since it is the most economical and serves substantially the same function as the No. 1 fuel oil. Unexpectedly, any of the latter fuel oils, although heated to a temperature of about 250°C., will commence dissolution of the plastic material.

Any thermoplastic waste material or mixtures of such materials may be used. In practice, it is quite usual to utilize mixtures of such materials, since more than one kind of thermoplastic material is found as waste material. Advantageously, the plastic materials may all be admixed prior to comminution or shredding. Illustrative thermoplastic waste products are: polyethylene, polypropylene, polystyrene, polyvinyl chloride, polyethylene terephthalate, nylon, polymethacrylate, polymethylmethacrylate, polyvinylidene chloride, and mixtures of the same. As stated above, from 1 to 20 percent of the thermoplastic materials, by weight, are added to the hot fuel oil solvent. When substantial proportions of chlorine-containing plastics, usually 10 percent or more, are utilized, it is desirable to add a neutralizing agent to the mixture to prevent evolution of free hydrochloric acid, a product of combustion. Suitable neutralizing agents are powdered zinc or calcium carbonate or calcium soaps, such as calcium stearate or calcium oleate.

It is a good practice to incorporate a small amount of any well-known, commercially available depolymerization or cracking catalyst, usually from about 1 64 to 10 percent, by weight, into the fuel oil thermoplastic waste product in the event dissolution is difficult to achieve. The catalyst selectively depolymerizes the thermoplastic material. Exemplary cracking or depolymerization catalysts are: acid-washed diatomaceous earth, aluminum chloride, low alumina cracking catalyst, and high alumina cracking catalyst.

In general, the temperatures necessary to effect the overall dissolution of the thermoplastic waste material can vary over a wide range, usually from about 250°C. to about 450°C. Usually, superatmospheric pressures are additionally employed to insure total dissolution of the thermoplastic materials. Pressures ranging from above 15 psig. can be used. A good operating range is between 150 psig. and 2,500 psig. Where the higher pressures are used, usually dissolution of the thermoplastic material is effected within 10 minutes to 10 hours and, preferably, within one-half to 4 hours.

In order to illustrate the invention with greater particularity, the following examples are presented. These are not be taken as limitative of the invention but merely illustrative of the best mode of operation. Unless otherwise noted, the parts given are by weight.

EXAMPLE 1

Two parts of a butadiene rubber-modified methacrylate polymer are shredded and added to 98 parts of No. 6 fuel oil at 250°C. (482°F.) and heated to 280°C. (536°F.) at atmospheric pressure with refluxing. The plastic is found to have completely dissolved after 2 hours, and the resulting solution has a viscosity of 20 cps. at 135°C. (275°F.). The solution is pumped to an incinerator burner through an atomizing nozzle and there substantially completely burned to the normal products of combustion, namely, carbon dioxide, carbon monoxide, and water. Small amounts of sulfur

EXAMPLE 2

To 99 parts of No. 6 fuel oil are added 1 part of shredded low-density polyethylene plastic and 7.75 percent of a rare earth Y, low alumina cracking catalyst, identified as TS-150 and manufactured by the American Cyanamid Company. The mixture is heated to 388°C. (730°F.) in a hermetically closed container, reaching a pressure of 2,500 psig. The solution is filtered hot from the container after 3 hours, whereby the cracking catalyst is completely recovered and recycled for reuse. The polyethylene is found to have gone completely into solution. The oil mixture, upon cooling to room temperature, remains normally fluid having a viscosity of 360 cps. at 23.5°C. (74°F.) which is much lower than oil alone and can be pumped to a burner which consumes all the fuel-oil mixture.

EXAMPLE 3

To a suitable pressure vessel is added a mixture of 10 parts of shredded butadiene rubber-modified methacrylate polymer and 5 parts of polyethylene terephthalate in the presence of 10 parts of rare earth Y, low alumina cracking catalyst (identified in Example 2 above as TS-150) and 85 parts of heated No. 6 fuel oil at 250°C. The vessel is closed and the pressure is increased to about 2,000 psig. while heating the contents therein to about 385°C. After 1½ hours, heating is terminated and the pressure reduced to atmospheric pressure. The contents in the vessel are filtered to remove catalyst. Resultant solution, when cooled to room temperature, remains a liquid.

The latter is next fed in an atomized state to an incinerator burner which efficiently consumes the fuel-oil mixture.

EXAMPLE 4

To a suitable reaction vessel containing 80 parts of No. 6 fuel oil heated to a temperature of about 300°C. (572°F.) are added in shredded form 4 parts of low-density polyethylene, 2 parts of high-density polyethylene, 1 part of polypropylene, 3 parts of polyvinyl chloride, 1 part of vinylidine chloride, 3 parts of polystyrene, 3 parts butadiene rubber-modified polymethacrylate polymer, 2 parts of polyethylene terephthalate, and 1 part of nylon. The mixture is next heated to 388°C. (730°F.) at which point 10 percent of a hydrochloric acid-washed diatomaceous earth is added, and the vessel is hermetically closed. Heating is continued until a temperature of 450°C. (842°F.) and a pressure of 2,500 psig. are reached. After 2 hours of heating, the gases are vented through a scrubber containing an alkaline solution. The solution is filtered hot from the container, whereby the depolymerization catalyst is completely recovered and recycled.

It is noted that all the thermoplastic materials have gone completely into solution. The solution, upon cooling to room temperature, is a thick paste, i.e., about 100,000 cps. at 22°C. (72°F.) which becomes a liquid upon heating having a viscosity of 62 cps. at 110°C. (230°F.). The hot solution is pumped to a burner where it is atomized and completely burned.

Advantageously, the process of the present invention may be carried out either batchwise or continuously. In the normal operation of a municipal incinerator or commerical power burner, there may be admixed a thermoplastic waste product and fuel oil. The thermoplastic product is disposed of by depolymerization, and the resultant oil solution is atomized and burned. This is accomplished without adversely clogging the burner grates and adding substantially to the air pollution.

We claim:

1. A process for the disposal of thermoplastic materials which comprises: dissolving from about 1 to about 20 percent, by weight, of at least one thermoplastic material in about 99 to 80 percent, by weight, of a fuel oil under elevated temperatures and at atmospheric or superatomospheric pressure, and then completely burning the resultant fuel solution.

2. The process of claim 1 wherein the pressure employed ranges from 15 psig. to 2,500 psig.

3. The process according to claim 1 wherein from about 1 to about 10 percent, by weight, of a depolymerization or cracking catalyst is added to the mixture prior to burning, filtering the resultant hot solution to remove the catalyst prior to the burning of the fuel-oil soultuion, atomizing said filtered solution, and burning the same.

4. The process according to claim 1 wherein the thermoplastic material is polyethylene.

5. The process according to claim 1 wherein the thermoplastic material is butadiene rubber-modified polymethacrylate.

6. The process according to claim 1 wherein the thermoplastic material is polystyrene.

7. The process according to claim 1 wherein the thermoplastic material is a mixture of polyethylene terephthalate and butadiene rubber-modified polymethacrylate.

8. The process according to claim 1 wherein the thermoplastic material is a mixture of polyethylene, polypropylene, polyvinyl chloride, vinylidene chloride, polystyrene, polymethacrylate, polyethylene terephthalate, and nylon.

* * * * *